United States Patent [19]

Ohtani et al.

[11] Patent Number: 4,870,861
[45] Date of Patent: Oct. 3, 1989

[54] LIQUID LEVEL INDICATOR

[75] Inventors: Yukio Ohtani; Yoshitake Sato, both of Shimada, Japan

[73] Assignee: Yazaki Corporation, Japan

[21] Appl. No.: 111,718

[22] Filed: Oct. 23, 1987

[30] Foreign Application Priority Data

Oct. 24, 1986 [JP] Japan .................. 61-162338
Oct. 24, 1986 [JP] Japan .................. 61-162337
Jul. 24, 1987 [JP] Japan .................. 62-112725[U]

[51] Int. Cl.⁴ .............................. G01F 23/56
[52] U.S. Cl. ........................ 73/317; 73/313; 338/33
[58] Field of Search ............ 73/317, 313; 340/625; 338/33, 86, 68

[56] References Cited

U.S. PATENT DOCUMENTS

| 2,624,821 | 1/1953 | McCandelless | 73/313 |
| 2,752,783 | 7/1956 | Fauvelot | 73/313 |
| 3,449,955 | 6/1969 | Stadelmann | 73/313 |
| 4,114,130 | 9/1978 | Sutton et al. | 73/317 |
| 4,441,364 | 4/1984 | Montie | |
| 4,532,491 | 7/1985 | Rau et al. | 73/317 |
| 4,557,144 | 12/1985 | Lucchini | 73/317 |

FOREIGN PATENT DOCUMENTS

| 0007072B1 | 4/1982 | European Pat. Off. | |
| 0243254 | 10/1987 | European Pat. Off. | 338/68 |
| 3330871 | 3/1984 | Fed. Rep. of Germany. | |
| 2602621 | 7/1986 | Fed. Rep. of Germany. | |
| 1336244 | 7/1963 | France | 340/625 |
| 2391454 | 1/1979 | France | 73/313 |
| 0018720 | 1/1985 | Japan | 73/313 |
| 1111071 | 4/1968 | United Kingdom | 73/317 |
| 1166418 | 10/1969 | United Kingdom | 338/33 |
| 2083628 | 3/1982 | United Kingdom. | |

Primary Examiner—William A. Cuchlinski, Jr.
Assistant Examiner—Thomas B. Will
Attorney, Agent, or Firm—Wigman & Cohen

[57] ABSTRACT

To assemble liquid level indicator having an indicator frame, a contact holder, a resistor, a contact and a float in an automatic assembly system, the contact holder is formed into a crank shape having a first arm for holding the contact and a second arm for holding the float arm. Therefore, the contact holder can be assembled with the frame when moved in the direction the same as that along which the other parts are moved for assembly with the frame. Further, the contact is assembled when moved in the same direction, and the contact holder is temporarily fixed to the indicator frame for further facilitating the assembly work of the liquid level indicator.

4 Claims, 4 Drawing Sheets

LIQUID LEVEL INDICATOR

BACKGROUND OF THE INVENTION

1. Field of the Invention

The present invention relates to a liquid level indicator disposed within a fuel tank for an automotive vehicle, for instance to measure a quantity of fuel remaining within the tank, and more specifically to a structure of the liquid level indicator suitable for being assembled by an automatic assembly machine or system.

2. Description of the Prior Art

A liquid level indicator is usually composed of an indicator frame, a contact holder pivotally supported by the frame, a float fixed to the contact holder, an electric contact fixed to the contact holder, a resistor fixed to the indicator frame. Therefore, when the float is moved up and down according to liquid level, the contact fixed to the contact holder is moved to and fro by the float relative to the resistor fixed to the frame, so that an electric signal whose voltage or current is proportional to liquid level can be obtained.

In the prior-art liquid level indicator, since the above-mentioned various parts (float, contact holder, contact, and resistor) are assembled with the indicator frame in different directions, there conventionally exists a problem in that the indicator is difficult to assemble in an automatic assembly line.

The arrangement of the prior-art liquid level indicator will be described in more detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a liquid level indicator suitable for being assembled by an automatic assembly system.

To achieve the above-mentioned object, a liquid level indicator having an indicator frame, a contact holder, a resistor, a contact, and a float arm including a float, according to the present invention is characterized in that the contact holder is formed into a crank shape to provide an easy automatic assembly in such a way that the contact holder is assembled with the indicator frame when moved in the same direction as that along which other elements are moved for assembly with the indicator frame.

In more detail, the contact holder of the present invention is formed into a crank shape having a first arm for holding the contact, a second arm for holding an intermediate portion of the float arm, and a crank shaft portion extending between the first and second arms substantially in parallel to a bearing of the indicator frame.

Further, the contact holder is formed with a pair of slits and a pair of stepped portions, and the contact is formed with a pair of vertical members each including a lock claw to be locked open into engagement with the stepped portion when the vertical members are fitted to the slits of the contact holder. Therefore, the contact is also locked to the contact holder when moved in the same assembly direction.

Furthermore, it is preferable that the contact holder is formed with a dowel and the indicator frame is formed with a dowel hole, so that the contact holder is temporarily assembled with the indicator frame in engagement of the dowel with the dowel hole by the aid of a coil spring disposed between the contact holder and the indicator frame.

BRIEF DESCRIPTION OF THE DRAWINGS

The features and advantages of the liquid level indicator according to the present invention will be more clearly appreciated from the following description of the preferred embodiments of the invention taken in conjunction with the accompanying drawings in which like reference numerals designate the same or similar elements or parts throughout the figures thereof and in which.

DETAILED DESCRIPTION OF THE PREFERRED EMBODIMENTS

To facilitate understanding of the present invention, a brief reference will be made to a prior-art liquid level indicator, with reference to the attached drawings.

Figure 1A:
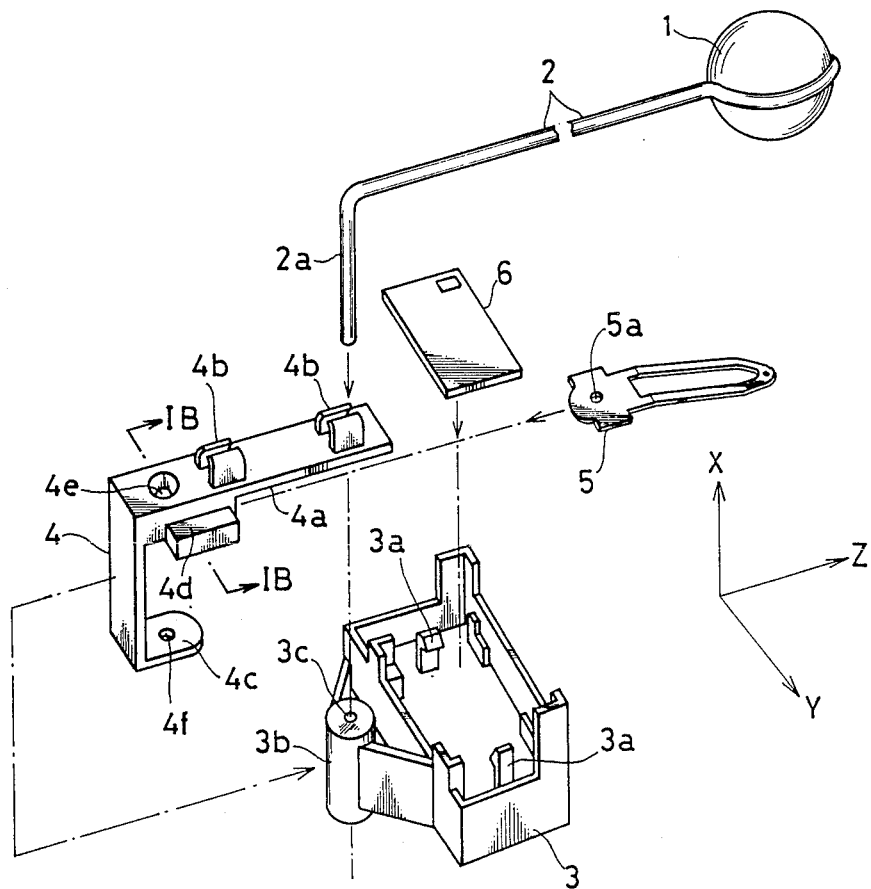
FIG. 1A is an exploded view showing an example of prior-art liquid level indicator.
Figure 1B:
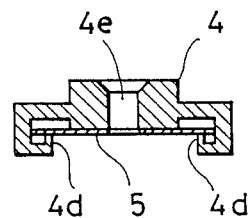
FIG. 1B is a cross-sectional view showing a sliding engagement relationship between a contact holder and a contact of the prior-art liquid level indicator.

In FIG. 1A, the prior-art liquid level indicator comprises an indicator frame 3, a resistor 6, a float 1 fixed to a float arm 2, a contact holder 4 and an electric contact 5. The resistor 6 is fixed to the frame 3 via two elastic lock claws 3a. The float arm 2 is fixed to the contact holder 4 via two pairs of split hook members 4b. The contact holder 4 is pivotally supported by the indicator frame 3 when assembled. The electric contact 5 is fitted to a pair of grooves formed at two contact support projections 4d arranged at both sides of the contact holder 4 as depicted in FIG. 1B.

The frame 3 is molded from a synthetic resin, and formed with a cylindrical bearing 3b with a hole 3c at the center thereof. The contact holder 4 is also molded into roughly a U-shape from a synthetic resin. The first arm 4a of the holder 4 is formed with two pairs of split hook members 4b, two contact support projections 4d, and a hole 4e, while the second arm 4c is formed with a hole 4f.

A bent end 2a of the float arm 2 extending in the X direction in FIG. 1A is passed through the hole 4e of the contact holder 4, a hole 5a of the contact 5, the hole 3c of the bearing 3b of the frame 3 and the hole 4f of the holder 4, when the holder 4 is assembled with the frame 1. The float arm 2 extending in the Z direction is fixed to the holder 4 via two pairs of split hook members 4b.

When the float 1 is moved up and down (in the Y direction) according to liquid level within a tank (not shown), since the float arm 2 is pivoted to and fro relative to the frame 3, the contact 5 slides on the resistor 6, so that it is possible to obtain a signal indicative of a liquid level on the basis of change in resistance determined between the contact 5 and the resistor 6.

In assembly, (1) the resistor 6 is moved down into the frame 3 along the X direction to a position at which the resistor 6 is fixed to the frame 3 by the two elastic claws 3a; (2) the contact 5 is moved horizontally along the Z direction to a position at which the contact 5 is located under the contact support projections 4d of the first arm 4a of the holder 4; (3) the holder 4 is moved horizontally along the Z direction to a position at which the bearing 3b is aligned with the two holes 4e and 4f of two arms 4a and 4c; (4) the bent end 2a of the float arm 2 is moved downward along the X direction so as to pass the holes 4e, 5a, 3c and 4f to a position at which the long float arm 2 is fixed to the holder 4 via the split hook members 4b.

In the prior-art level indicator as described above, however, since the contact 5 and the contact holder 4 are moved horizontally (in the Z direction) and the float arm 2 and the resistor 6 are moved vertically (in the X direction), the number of assembly steps is large and therefore it is difficult to assemble the liquid level indicator through an automatic assembly system.

In view of the above description, reference is now made to an embodiment of the liquid level indicator according to the present invention.

Figure 2A:
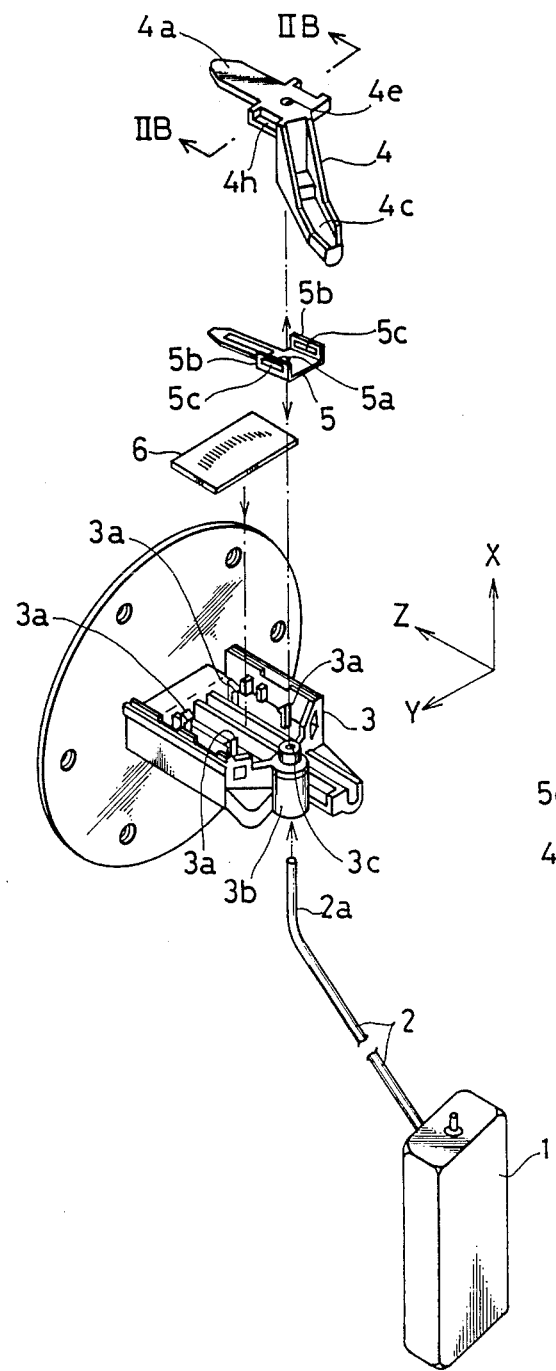
FIG. 2A is an exploded view showing an embodiment of the liquid level indicator of the present invention.

In FIG. 2A, the liquid level indicator of the present invention comprises an indicator frame 3, a resistor 6, a float 1 fixed to a float arm 2, a contact holder 4 and an electric contact 5, in the same way as the prior-art indicator shown in FIG. 1A. However, it should be noted that the resistor 6, the float arm 2, the contact holder 4 and the contact 5 are all assembled with the indicator frame 3 when moved along the same X direction.

To realize the above-mentioned single direction assembly, the contact holder 4 and the contact 5 are different from the prior-art elements.

Figure 2B:
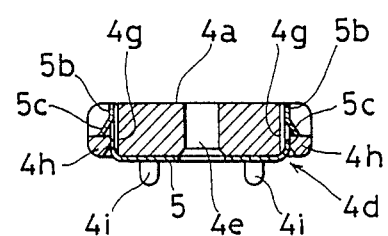
FIG. 2B is a cross-sectional view showing a locking engagement relationship between a contact holder and a contact of the present invention.
Figure 5:
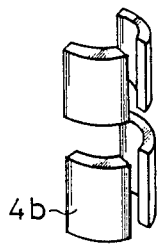
FIG. 5 is a perspective view showing two pair of split hook members.

In the drawing, the contact holder 4 is formed into a roughly crank shape, and a contact support portion 4d is provided for the contact holder 4 as shown in FIG. 2B. In more detail, the contact holder 4 includes a first arm 4a for holding the contact 5, a second arm 4c for holding an intermediate portion of the float arm, and a crank shaft portion extending between the two arms substantially in parallel to the bearing 3b of the indicator frame 3 when assembled. The first arm 4a is formed with a hole 4e and a pair of contact support portions 4d (shown in FIG. 2B), while the second arm 4c is formed with a pair of split hook members 4b (shown in FIG. 3A or FIG. 5) similar to the prior-art ones.

The contact support portion 4d includes a pair of slits (extending in the vertical direction in FIG. 2B) 4g, a pair of contact lock stepped portions 4h, and a pair of contact locating pins 4i. On the other hand, the contact 5 is formed with a pair of vertical members 5b each including a contact lock claw 5c, a hole 5a, and two locating holes (not shown). The vertical members 5b are fitted to the slits 4g; the lock claws 5c are locked open on the stepped portions 4h; the float arm 2 is passed through the hole 5a; and the locating pins 4i are fitted to the locating holes (not shown).

Therefore, when the contact 5 is moved from under to the holder 4 along the X direction, since the vertical members 5b are inserted into the slits 4g and the lock claws 5c are locked open on the stepped portions 4h, the contact 5 is fixed to the contact holder 4.

The frame 3 is quite the same as the prior-art one, which includes an elastic lock claws 3a and a cylindrical bearing 3b.

In assembly, (1) the resistor 6 is fixed to the frame 3 by the elastic lock claws 3a when moved downward in the X direction; (2) the contact 5 is locked to the holder 4 by the contact support portion 4d formed on the under surface of the holder 4 when moved upward in the X direction; (3) the holder 4 is temporarily attached to the frame 3 (described later in detail) when moved downward in the X direction; (4) the bent end 2a of the float arm 2 is inserted into the hole 3c of the bearing 3b of the frame 3 and the hole 4e of the holder 4 when moved upward in the X direction until the arm 2 is locked by the split hook members 4b of the holder 4, so that the float arm 2, the holder 4 and the contact 5 are fixed together and pivotal relative to the frame 3.

As described above, the contact holder 4, the contact 5, the resistor 6 and the float arm 2 are all assembled to the indicator frame 3, when moved in the same X-direction, thus providing an easy assembly procedure in automatic assembly system.

In the above liquid level indicator, the holder 4 is fitted to the frame 3 from above, while the float arm 2 is inserted into the hole 4e of the holder 4 from under. In practical assembly procedure, first the contact holder 4 is set to the frame from above; secondly, the frame 3 is turned upside down; thirdly, the float arm 2 is inserted from above. At this procedure, it is necessary to temporarily fix the contact holder 4 to the frame 3 without use of a special jig in order to improve the assembly work efficiency.

Figure 3A:
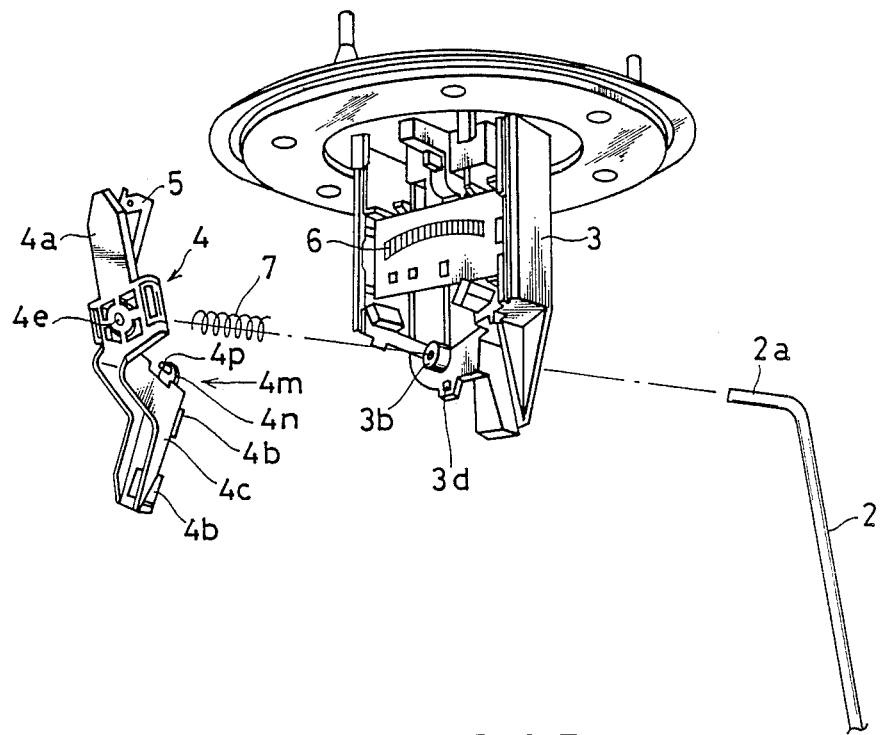
FIG. 3A is an exploded view showing a pivotal engagement relationship between an indicator frame and a contact holder, a float.

Therefore, the second arm 4c of the contact holder 4 is formed with a temporary lock member 4m composed of a tab member 4n and dowel 4p, as shown in FIG. 3A. This tab member 4n extends toward the assembled float arm 2a from a position a little away from the hole 4e through which float arm 2a is passed. The dowel 4p projects toward the first arm 4a of the contact holder 4 along the axial direction of the float arm 2a.

On the other hand, a dowel hole 3d is formed in the frame 3 a little away from the bearing 3b, so that the dowel 4p is engageable with the dowel hole 3d when the contact holder is temporarily assembled with the frame 3.

Figure 3B:
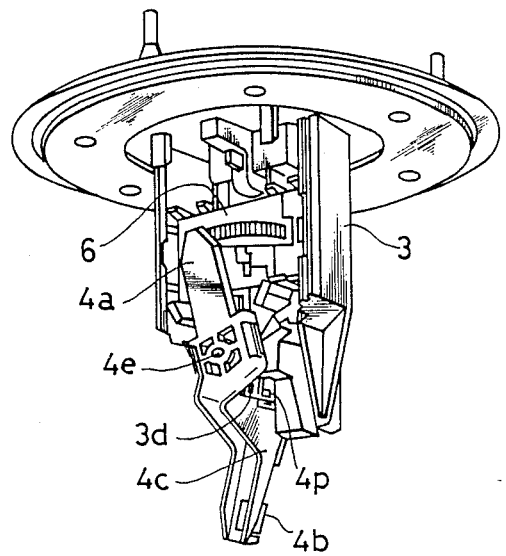
FIG. 3B is a perspective view showing a temporary engagement of the contact holder with the indicator frame.

FIG. 3A is an exploded view of the frame 3, the contact holder 4 and the float arm 2, which shows the mutual assembly relationship between these three parts. FIG. 3B shows a temporary engagement condition, in which the contact holder 4 is temporarily fixed to the bearing 3b of the frame 3; that is, the dowel pin 4p of the contact holder 4 is fitted to the dowel hole 3d of the frame 3 before the float arm 2a is inserted into the bearing 3b of the frame 3 and the hole 4e of the contact holder 4.

Figure 4A:
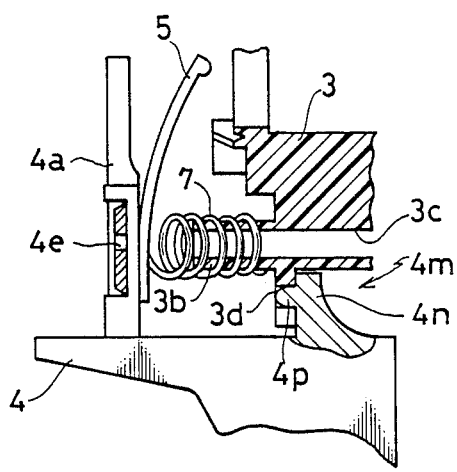
FIG. 4A is an enlarged fragmentary cross-sectional view, for assistance in explaining a temporary engagement relationship between the contact holder and the indicator frame.

FIG. 4A shows this temporary engagement condition more clearly. A coil spring 7 is disposed between the contact holder 4 and the bearing 3b of the frame 3 to firmly fit the dowel pin 4p into the dowel hole 3d so that the tab member 4n is brought into contact with the frame 3. In other words, the contact holder 4 is temporarily fixed to the frame 3 by the spring force.

Figure 4B:
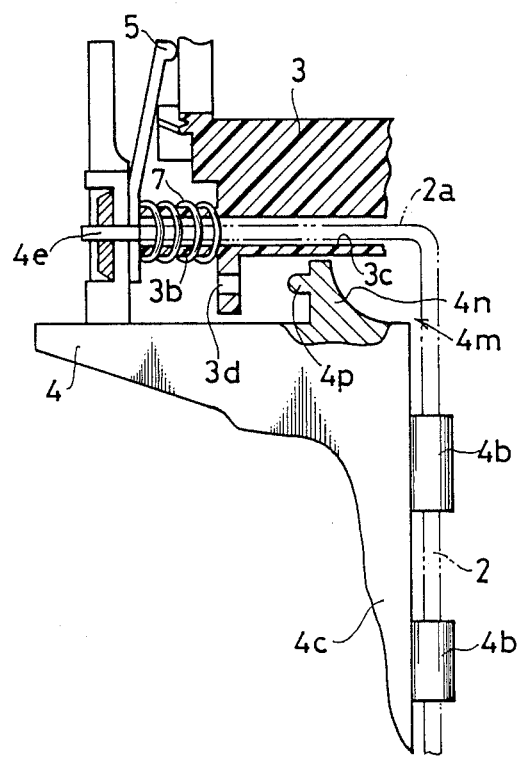
FIG. 4B is a view similar to FIG. 4A, for assistance in explaining a complete engagement relationship between the contact holder and the indicator frame due to engagement of a float arm with two split hook members.

FIG. 4B shows the state where the float arm 2 is inserted into the hole 3c of the bearing 3b of the frame 3 and fixed to the contact holder 4 via the split hook members 4b formed on the lower surface of the second arm 4c of the contact holder 4.

Under these conditions, the end of the bent float arm 2a is pressure fit or fixed by a nut to the central hole 4e of the contact holder 4; the float arm 2 is engaged with the split hook members 4b; and the dowel 4p is disengaged from the dowel hole 3d. Therefore, the contact holder 4 is pivotal together with the float arm 2 about the bearing 3b of the frame 3.

In assembly, (1) one end of the coil spring 7 is fixed to the contact 5 locked to the contact holder 4; (2) the contact holder 4 is brought to near the frame 3 so that the other end of the coil spring 7 is concentrically located to the bearing 3b of the frame 3; (3) the coil spring 7 is compressed to engage the dowel 4p with the dowel hole 3d and then released; (4) the frame 3 is turned upside down; (5) the bent end 2a of the float arm 2 is inserted into the bearing 3b of the frame 3, the coil spring 7 and the hole 4e of the contact holder 4 (in this step no jig is required because the holder 4 is temporarily fixed to the frame 3); (6) the contact holder 4 is pushed toward the frame until the float arm 2 is engaged with the split hook member 4b, so that the dowel 4p is disengaged from the dowel hole 3d; (7) an end of the bent float arm 2a is fixed to the hole 4e the holder 4.

As described above, in the liquid level indicator according to the present invention, since all the elements are assembled with the indicator frame when moved in the same assembly direction, the liquid level indicator is suitable for being assembled in an automatic assembly system.

What is claimed is:
1. A liquid level indicator comprising:
    (a) an indicator frame (3) having a bearing (3b) and resistor lock claws (3a);
    (b) a resistor (6) fixed to said indicator frame by the resistor lock claws (3a);
    (c) a contact holder (4) formed into a crank shape having a first arm (4a) provided with a pair of slits (4g), a pair of stepped portions (4h) and a float arm hole (4e), a second arm (4c) provided with at least one split hook member (4b), and a crank shaft portion extending between said first and second arm substantially parallel to the bearing (3b) of said indicator frame (3).
    (d) a contact (5) formed with a pair of vertical members (5b) each including a lock claw (5c) to be locked open into engagement with one of the stepped portions of said contact holder when the vertical members are fitted to the slits of said contact holders; and
    (e) a float arm (2) having a free end, a pivotal end, and an intermediate portion between said free end and said pivotal end, a float (1) fixed at said free end, said pivotal end fitted to the bearing (3b) of said indicator frame and the float arm hole (4e) of said contact holder, and said intermediate portion of said float arm fixed to the split hook member (4b) of the second arm (4c) if said contact holder, wherein said resistor, said contact holder, said contact, and said float arm are assembled with said indicator frame by movement in a single assembly direction.

2. The liquid level indicator as set forth in claim 1, wherein said contact holder (4) is further formed with a dowel (4p) and said indicator frame (3) is further formed with a dowel hole (3d), so that said contact holder is temporarily assembled with said indicator frame in engagement of the dowel with the dowel hole by the aid of a coil spring disposed between said contact holder and said indicator frame, before said float arm is assembled to said indicator frame and said contact holder.

3. A liquid level indicator comprising:
    an indicator frame (3) having a bearing (3b) and resistor lock claws (3a), a contact holder (4) having a first arm (4a) and a second arm and provided with a float arm hole (4e), at least one stepped portion (4h), a contact (5) mounted on said contact holder, a resistor (6) mounted on said indicator frame by means of said resistor lock claws (3a), a float arm (2) forming a crank shape having a free end, another end opposite said free end, and a middle portion intermediate said free end and said other end, a float (1) mounted on said free end, said opposite end being rotatably mounted within the bearing of said indicator frame and said float arm hole of said contact holder (4);
    the improvement wherein,
    (a) said contact holder (4) has a third arm (4c) formed so that the contact holder (4) has a crank shape,
    (b) said third arm (4c) is provided with means (4b) for mounting said middle portion of said float arm (2),
    (c) said contact (5) is provided with locking means (5b, 5c) so that said contact can be clipped on said contact holder (4), and
    (d) the mounting means (3a, 5b, 5c, 4h, 4b) of the individual liquid level indicator elements are arranged and aligned such that a complete mounting operation of the elements can be realized by moving them in opposite moving directions aligned along a single mounting axis, and further
    (e) wherein said contact holder (4) is further formed with a dowel (4p) and said indicator frame (3) is further formed with a dowel hole (3d), so that said contact holder is temporarily assembled with said indicator frame in engagement of the dowel with the dowel hole by the aid of a coil spring disposed between said contact holder and said indicator frame, before said float arm is assembled to said indicator frame and said contact holder.

4. A liquid level indicator according to claim 3, wherein the means (4b) for mounting said middle portion of said float arm (2) with which said third arm (4c) of said contact holder (4) is provided comprises locking means (4b) into which the middle portion of said float arm can be locked.

* * * * *